(12) United States Patent
Inomata

(10) Patent No.: US 7,308,128 B2
(45) Date of Patent: Dec. 11, 2007

(54) MAGNIFYING OBSERVATION APPARATUS, METHOD FOR OBSERVING MAGNIFIED IMAGE, AND COMPUTER-READABLE MEDIUM

(75) Inventor: Masahiro Inomata, Osaka (JP)

(73) Assignee: Keyence Corporation, Osaka (JP)

( * ) Notice: Subject to any disclaimer, the term of this patent is extended or adjusted under 35 U.S.C. 154(b) by 884 days.

(21) Appl. No.: 10/723,399

(22) Filed: Nov. 25, 2003

(65) Prior Publication Data

US 2004/0105576 A1    Jun. 3, 2004

(30) Foreign Application Priority Data

Nov. 28, 2002  (JP)  ............ P. 2002-345652

(51) Int. Cl.
*G06K 9/00*  (2006.01)
(52) U.S. Cl. ................................... 382/141
(58) Field of Classification Search ........ 382/141–149, 382/199, 209, 218, 298
See application file for complete search history.

(56) References Cited

U.S. PATENT DOCUMENTS 5,384,654 A * 1/1995 Iba ........................ 359/364
5,417,210 A * 5/1995 Funda et al. ............ 600/425
6,906,794 B2 * 6/2005 Tsuji ...................... 356/237.4
2001/0006571 A1 * 7/2001 Miura et al. ............. 385/52

FOREIGN PATENT DOCUMENTS

| JP | 11-164293 | 6/1999 |
| JP | 2000-171216 | 6/2000 |
| JP | 2000-214790 | 8/2000 |

* cited by examiner

*Primary Examiner*—Daniel Mariam
(74) *Attorney, Agent, or Firm*—Kilyk & Bowersox, P.L.L.C.

(57) ABSTRACT

The magnifying observation apparatus includes an imaging section for photographing an observation image, a display for displaying the observation image based on an image signal acquired with the imaging section, and a controller. The controller performs signal processing on an image signal and detects edge information on an edge contained in the observation image. The controller also extracts an edge section on the periphery of the points indicated with a point indication section and performs predetermined image processing on the edge section extracted. The display displays the resulting edge section over the observation image.

15 Claims, 6 Drawing Sheets

MAGNIFYING OBSERVATION APPARATUS, METHOD FOR OBSERVING MAGNIFIED IMAGE, AND COMPUTER-READABLE MEDIUM

BACKGROUND OF THE INVENTION

1. Field of the Invention

The present invention relates to a magnifying observation apparatus for photographing and displaying a magnified image such as a microscope, a method for observing a magnified image, and a computer-readable medium storing instructions for operating the magnifying observation apparatus.

2. Description of the Related Art

Today, optical microscopes using optical lens or digital microscopes are in use as magnifying observation apparatus which display magnified micro-objects. A microscope is equipped with a light receiving element such as a CCD for electrically reading, per pixel arranged two-dimensionally, a reflected light or a transmitted light from an observation subject fixed to an observation subject fixing section incident via an optical system. The microscope displays on a display section such as a display an image electrically read using a CCD (for example see the Japanese Patent Laid-Open No. 2000-214790).

It is a common practice that an operator uses an imaging system such as a microscope to manually measure the dimensions of an image on the display. For example, when measuring a dimension from one section to another on the screen, the operator specifies a single point on the screen with a pointing device such as a mouse and then specifies another point to perform measurement of the distance between the two points.

However, in case dimensions are measured on the display by way of manual operation, there arise variations in the measurement results depending on the person who performed measurement. While an operator specifies the measurement points while watching the screen in manual operation, which points are to be specified as measurement points depends on the operator. For example, when a boundary is specified, which section is specified as a boundary depends on the operator. This results in variations between persons who perform measurement. Such variations cause measurement errors thus degrading the reproducibility of measurement. In particular, in case the diameter of a circle is to be measured, specification of measurement points is likely to be subject to variations.

SUMMARY OF THE INVENTION

The invention has been accomplished in order solve the aforementioned problems. It is an object of the present invention to provide a magnifying observation apparatus, a method for observing a magnified image, and a computer-readable medium storing instructions for operating the magnifying observation apparatus, which can eliminate errors between users and obtain measurement results with high reproducibility based on predetermined standards.

In order to attain the object, the invention provides, in its first aspect, a magnifying observation apparatus comprising: an imaging section for photographing an observation image; a display section for displaying the observation image based on an image signal acquired with the imaging section; an edge detection section for performing signal processing on the image signal acquired with the imaging section and detecting edge information on an edge contained in the observation image; a point indication section for indicating an arbitrary point in the observation image displayed with the display section; an edge extraction section for extracting an edge section on the periphery of the point indicated with the point indication section based on the edge information on the observation image; and a highlight section for performing predetermined image processing on the edge section extracted with the edge extraction section and displaying the resulting edge section over the observation image.

This configuration eases the decision of an edge section, eliminates variations between users and facilitates indication of points.

The invention provides, in its second aspect, a magnifying observation apparatus according to the first aspect, wherein the edge detection section performs arithmetic operation of geometric information on the detected edge section, and displays the geometric information on the display section. With this configuration, it is possible to display geometric information on the detected edge section, for example the information on the size and position of the edge section.

The invention provides, in its third aspect, a magnifying observation apparatus according to the first aspect, wherein the edge detection section detects only the section matching a predetermined pattern in the edge information contained in the observation image. With this configuration, it is possible to easily select only a necessary edge section without being puzzled by an unnecessary edge.

The invention provides, in its fourth aspect, a magnifying observation apparatus according to the third aspect, wherein the predetermined pattern is at least one of a straight line, a circle, and an arc. With this configuration, the user can easily select a pattern such as a straight line.

Further, the invention provides, in its fifth aspect, a magnifying observation apparatus according to the first aspect, wherein the magnifying observation apparatus further comprises an arithmetic operation section for executing predetermined arithmetic operation based on the extracted edge section. With this configuration, it is possible to execute arithmetic operation of the distance and area based on the uniquely extracted edge section, thus obtaining arithmetic operation results with high reproducibility.

The invention provides, in its sixth aspect, a magnifying observation apparatus according to the fifth aspect, wherein the point indication section indicates a plurality of points in a single observation image to select a plurality of edge sections and the edge extraction section extracts the respective edge sections corresponding to these points, and wherein the arithmetic operation section executes predetermined arithmetic operation based on the selected edge sections and display the result of arithmetic operation on the display section. With this configuration, it is possible to execute arithmetic operation of the length, inclination and area based on one or a plurality of edge sections. For example, it is possible for any user to execute arithmetic operation of the area of a specified region or distance between specified two points, with the same results obtained.

The invention provides, in its seventh aspect, a method for observing a magnified image which uses a magnifying observation apparatus comprising an imaging section for photographing an observation image and a display section for displaying the observation image based on an image signal acquired with the imaging section, the method comprising: performing signal processing the image signal acquired with the imaging section and detecting edge information on an edge contained in the observation image; indicating an arbitrary point in the observation image displayed with the display section; extracting an edge section on the periphery of the point indicated based on the edge information on the observation image; and performing predetermined image processing on the edge section extracted and displaying the resulting edge section over the observation image.

This configuration eases the specification of an edge section with high reproducibility.

The invention provides, in its eighth aspect, a method for observing a magnified image according to the seventh aspect, wherein the method further comprises performing arithmetic operating of geometric information on the detected edge section and displaying the geometric information on the display section. With this configuration, the user can check the information on the desired edge section.

The invention provides, in its ninth aspect, a method for observing a magnified image according to the seventh aspect, wherein the edge detection step detects only the section matching a predetermined pattern in the edge information contained in the observation image. With this configuration, it is possible to easily extract only a desired edge section without inadvertently extracting an unnecessary edge section.

The invention provides, in its tenth aspect, a method for observing a magnified image according to the ninth aspect, wherein the predetermined pattern is at least one of a straight line, a circle, and an arc. With this configuration, the user can easily select a pattern such as a straight line.

Further, the invention provides, in its eleventh aspect, a method for observing a magnified image according to the seventh aspect, wherein the method further comprises executing predetermined arithmetic operation based on the extracted edge section. With this configuration, it is possible to easily and uniquely select an edge section, thus obtaining arithmetic operation results with high reproducibility based on the selected edge section.

The invention provides, in its twelfth aspect, a method for observing a magnified image according to the eleventh aspect, wherein the indication step indicates a plurality of points in a single observation image to select a plurality of edge sections and the extraction step extracts the respective edge sections corresponding to these points, and wherein the arithmetic operation step executes the arithmetic operation based on the selected edge sections and displays the results of the arithmetic operation on the display section. With this configuration, the user can easily obtain the arithmetic operation results on one or a plurality of edges. For example, the user knows the area of a specified region or distance between specified two points from the screen.

The invention provides, in its thirteenth aspect, computer-readable medium storing instructions for operating the magnifying observation apparatus an imaging section for photographing an observation image and a display section for displaying the observation image based on an image signal acquired with the imaging section, the instructions comprising; performing signal processing the an image signal acquired with the imaging section and detecting edge information on an edge contained in the observation image; indicating an arbitrary point in the observation image displayed with the display section; extracting an edge section on the periphery of the point indicated based on the edge information on the observation image; and performing predetermined image processing on the edge section extracted and displaying the resulting edge section over the observation image.

This configuration uniformly determines an edge section thus obtaining high reproducibility without variations between users.

The recoding media include magnetic disks, optical discs, magneto-optical disks, and other media such as semiconductor memories which can store programs, for example, CD-ROM, CD-R, CD-RW, or flexible disc, and magnetic tape, MO, DVD-ROM, DVD-RAM. DVD-R, DVD-RW, DVD+RW.

DETAILED DESCRIPTION OF THE INVENTION

Figure 1:
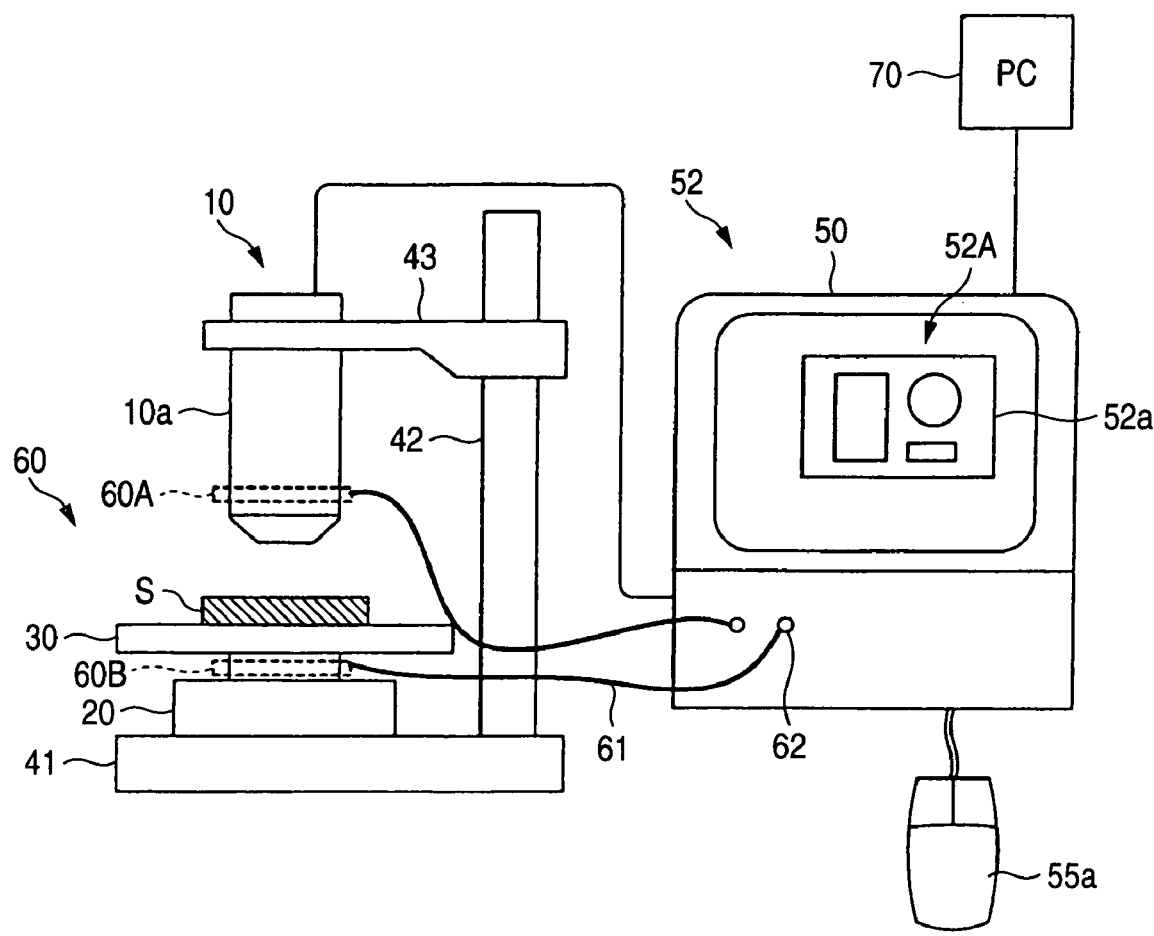
FIG. 1 is a general view showing the magnifying observation apparatus according to an embodiment of the invention.

Embodiments of the invention will be described referring to the drawings. The following embodiments illustrate a magnifying observation apparatus, a method for observing a magnified image, and a computer-readable medium storing instructions for operating the magnifying observation apparatus, used to embody the technical thoughts of the invention. Note that the invention is not limited to the following magnifying observation apparatus, method for observing a magnified image, and computer-readable medium storing instructions for operating the magnifying observation apparatus.

The specification does not limit the members defined in the claims to those in the embodiments. The size of each member and relation between the members are exaggerated depending on the drawings for simplicity.

Connection between the magnifying observation apparatus used in the embodiment of the invention and a computer, printer, an external storage device and other peripherals for performing processing including operation, control, and display is made electrically, magnetically or optically to perform communications via, for example, serial connection such as IEEE1394, RS-232 x and RS-422, and UBS, parallel connection, or a network such as 10BASE-T, 100BASE-TX, and 100BASE-T. The connection is not limited to a wired physical connection but maybe a wireless LAN such as IEEE802.11x or wireless connection using radio waves, infrared rays or optical communications such as Bluetooth. A medium for exchanging data and saving the setting may be a memory card, a magnetic disk, an optical disc, a magneto-optical disk, and a semiconductor memory.

The magnifying observation apparatus according to the embodiment of the invention will be described using FIGS. 1 through 6. As shown in FIG. 1, the magnifying observation apparatus comprises an illumination section 60 for illuminating an observation subject, an imaging section 10 for photographing the observation subject illuminated with the illumination section 60, and a display 52 for displaying a magnified image photographed with the imaging section 10.

Figure 2:
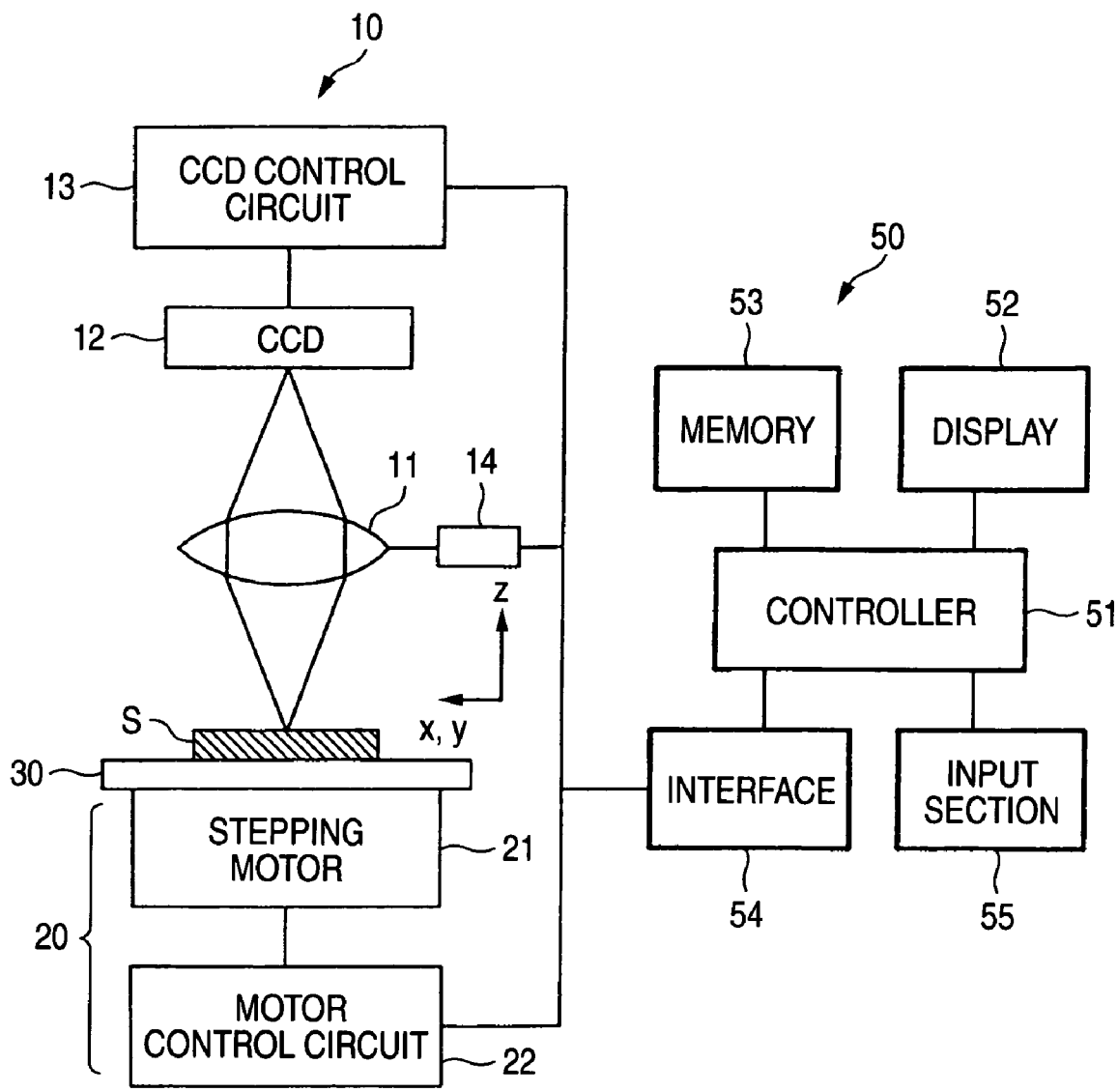
FIG. 2 is a block diagram showing the magnifying observation apparatus according to an embodiment of the invention.

To be more specific, as shown in FIG. 2, the imaging section 10 comprises a stage 30, a stage elevator 20, a CCD 12 as an image pick-up element, and a CCD control circuit 13. The stage 30 mounts the observation subject S as a form of an observation subject fixing section. The stage elevator 20 moves the stage 30 up and down. The CCD 12 electrically reads per pixel arranged two-dimensionally a reflected light or a transmitted light of a light which is incident into an observation subject fixed to the stage 30 via an optical system. The CCD control circuit 23 performs drive control of the CCD 12. Further, an information processor 50 as a main unit of the magnifying observation apparatus is connected to the imaging section 10. The information processor 50 comprises a memory 53 as an image data storage, the display 52 such as a display and a monitor as a form of display mean, an input section 55, and a controller 51. The memory 53 stores image data electrically read by the image pick-up element. The display 52 displays an image based on the image data electrically read by the image pick-up element. The input section 55 performs operations such as input based on a screen displayed on the display 52. The controller 51 performs processing such as image processing based on the information input with the input section 55.

The input section 55 is coupled to a computer via wired or wireless connection, or fixed to the computer. A general input section 55 includes, for example, a mouse or a keyboard, and various pointing devices such as a slide pad, a track point, a tablet, a joystick, a consol, a jog dial, a digitizer, a light-pen, a ten-key pad, a touch pad, and an acupoint. The input section 55 may be used to operate a program for operating magnifying observation apparatus as well as the magnifying observation apparatus and its peripherals. Further, a touch screen or touch panel may be used as a display to provide an interface screen so that the user can directly touch the screen with his/her hand for input or operation. Alternately, voice input or any other existing input means or a combination of these may be used. In the example of FIG. 1, the input section 55 is a mouse 55*a*.

FIG. 1 shows an external view of a magnifying observation apparatus according to an embodiment of the invention. A camera 10*a* comprising an optical system and an image pick-up element is attached to a camera attaching section 43 fixed to a support 42 extending vertically from a stand 41. On the stand 41 is arranged the stage elevator 20 on top of which is attached the stage 30 for placing the observation subject S. The camera 10*a* and the stage elevator 20 are connected to and controlled by the information processor 50. The information processor 50 comprises the display 52 and the input section 55 such as a mouse 55*a*. On the display 52 are displayed an observation image display 52A and an observation image 52*a*.

A computer 70 may be connected to the magnifying observation apparatus as the information processor 50. By separately installing a program for operating the magnifying observation apparatus in the computer 70, the magnifying observation apparatus may be operated from the computer 70. In the specification, the program for operating the magnifying observation apparatus using a computer includes an operation program installed in a general-purpose or dedicated computer externally connected to the magnifying observation apparatus and an operation program incorporated into the information processor 50 as a controller of the magnifying observation apparatus. In the magnifying observation apparatus, an operation feature or operation program to operate the magnifying observation apparatus is previously incorporated. The operation program may be installed into the magnifying observation apparatus in the form of rewritable software or firmware or may be updated as required. Thus, in the specification, a computer to execute a program for operating the magnifying observation apparatus includes the magnifying observation apparatus itself.

FIG. 2 shows a block diagram of the magnifying observation apparatus according to an embodiment of the invention. The information processor 50 comprises the display 52 as display section, the memory 53, an interface 54, and the input section 55. The memory 53 stores a control program, focal length information, light reception data and two-dimensional information. The information processor 50 communicates with the camera 10*a* and the stage elevator 20 via the interface 54. The operator performs operation concerning the magnifying observation apparatus using the input section 55. The stage elevator 20 comprises, for example, a stepping motor 21 and a motor control circuit 22 for controlling elevation of the stepping motor 21. The imaging section 10 comprises, for example, a light receiving element such as the CCD 12 serving as an image pick-up element, the CCD controller circuit 13, and an optical system 11. The CCD controller circuit 13 performs drive control of the CCD 12. The optical system 11 forms on the CCD 12 an image of a reflected light or a transmitted light of a light irradiated onto the observation subject S placed on the stage 30 from the illumination section 60.

The imaging section 10 can further comprise pixel shift means to obtain a resolution exceeding the resolution of the CCD 12 by way of pixel shift. The pixel shift is a process of compounding an image and another image obtained by photographing the subject with half pixel pitch shifted in order to obtain a higher resolution. Representative pixel shift mechanisms include the CCD drive system to shift an image pick-up element, the LPF inclination system to incline LPF, and the lens shift system to shift a lens. In FIG. 2, an optical path shift section 14 is provided for optically shifting the incident light path of a reflected light a transmitted light of incident onto the CCD 12 from the observation subject S fixed to the stage 30 via the optical system 11, at least in a single direction, at a distance smaller than the interval between two adjacent pixels of the CCD 12 in the direction. The mechanisms or approaches for enabling the pixel shift are not limited to the aforementioned configurations but well known methods and methods to be developed in future may be available.

The information processor 50 inputs control data on the control of the stepping motor 21 into the motor control circuit 22 to vary the relative distance between the stage 30 as an observation subject fixing section and the camera 10*a* comprising the optical system 11 and the CCD 12 as a light receiving element in the optical axis direction, or height in the z direction in this example. In particular, the information processor 50 inputs control data necessary to control the stage elevator 20 into the motor control circuit 22 to control rotation of the stepping motor 21 and elevates/lowers the height z (position in the z direction) of the stage 30. The stepping motor 21 generates a rotation signal in accordance with the rotation. Based on the rotation signal inputted via the motor control 25 circuit 22, the information processor 50 stores the height z of the stage 30 as information on the relative distance between the observation subject fixing section 30 and the optical system 11 in the optical axis direction. While the relative distance between the observation subject fixing section 30 and the optical system 11 in the optical axis direction is varied by varying the height of the stage 30 in this embodiment, the stage 30 maybe fixed and the height of the optical system 11, for example the height of the camera 10a may be varied.

The CCD 12 can electrically read the quantity of received light per pixel arranged two-dimensionally (x and y directions). The image of the observation subject S formed on the CCD 12 is converted to an electrical signal in each pixel in accordance with the quantity of received light and converted to digital data in the CCD control circuit 13. The information processor 50 stores into the memory 53 the digital data from the CCD control circuit 13 as light receiving data D together with the pixel arrangement information (x, y) as the two-dimensional position information of the observation subject in a plane (x and y directions in FIG. 2) approximately perpendicular to the optical axis direction (z direction in FIG. 2). The plane approximately perpendicular to the optical axis direction need not be a plane strictly at a right angle from the optical axis but way be an observation plane within the range of inclination where the shape of the observation subject can be recognized at the resolution of the optical system and the light receiving element.

While the observation subject is placed on the stage as an example of observation subject fixing section in the foregoing description, an arm may be attached instead of the stage and the observation subject may be fixed to the tip of the arm. The camera 10a may be attached to the camera attaching section 43 as mentioned earlier, and may be detachable and arranged at a desired position and a desired angle by holding the camera with hands.

The illumination section 60 shown in FIG. 1 comprises an incident-light illumination 60A for irradiating an incident light and a transmitting illumination 60B for irradiating a transmitted light. These illuminations are connected to the information processor 50 via the optical fiber 61. The information processor 50 comprises a connector 62 for connecting the optical fiber 61 and incorporates a light source (not shown) for transmitting a light to the optical fiber 61 via the connector 62. The light source may be a halogen lamp.

[Controller 51]

The controller 51 functions as an edge detection section for performing signal processing on an image signal and detecting edge information, and an edge extraction section for extracting an edge section on the periphery of the points indicated with a mouse based on the edge information. The controller 51 also functions as a highlight section for performing predetermined image processing on the edge section extracted and displaying the resulting edge section over the observation image, and an arithmetic operation section for executing predetermined arithmetic operation based on the extracted edge section.

[Edge Detection Section]

The controller 51 as edge detection section detects edge information on an edge contained in an observation image. The edge information includes position information on the coordinates such as the ends, or the starting point and endpoint of an edge, radius and center, and information on the size. The edge information may include information on the observation image, such as the image size and date of recording. Moreover, the results of predetermined arithmetic operation are recorded as edge information. The results of predetermined arithmetic operation are for example the area of a selected region, a distance between regions, and inclination.

In the specification, an edge refers to the boundary of an image extractable by image processing. The shape of an observation subject need not have an edge. For example, in case a pattern is drawn in a plane, the contour of the pattern constitutes an edge in the specification.

To detect edge information, the controller 51 performs noise removal processing on the binary image data comprising the binary data D' obtained by conversion of the light receiving data D into binary data in the CCD converter circuit 13 and the pixel arrangement information (x, y). The controller 51 further determines a boundary in the binary image data which has undergone noise removal processing and extracts the boundary as edge information. Then the controller 51 extracts patterns of geometric shapes such as a straight line, an arc, a circle, and an ellipse based on the characteristics of continuity of edge information in the plane where pixel are arranged. The controller 51 performs arithmetic operation of geometric numerical values representing the characteristics based on the types of geometric shapes such as the straight line, arc, circle, and ellipse detected.

The geometric numerical values include, for a straight line, an angle with respect to a horizon, length of a line segment, starting point coordinates and endpoint coordinates on the screen. For an arc, the geometric numerical values include the starting point angle and the endpoint angle of an arc with respect to a horizon, length of the arc, radius of the arc, and center coordinates of the arc on the screen on the display 52. For a circle, the geometric numerical values include the length of a circle, radius of the circle, and center coordinates of the circle. For an ellipse, the geometric numerical values include the major axis and minor axis of an ellipse, focidistance of an ellipse, focal coordinates, and circularity. The edge information detected in this way is stored into the memory 53.

Detection of an edge is not limited to the aforementioned method. As image processing for extracting an edge section from an observation image, well known methods and methods to be developed in future are available. The controller 51 may, by way of software, read image data stored in the memory 53 as an image data storage and perform binary image data conversion, noise removal and edge detection to detect an edge section. Alternatively, the controller 51 may comprise, as a hardware design, a binary image data converter circuit, a noise removal circuit and an edge detector circuit to detect an edge section. A combination of software and hardware approaches may be used. The information processor 50 stores the coordinates of a boundary at an edge section such as a straight line, an arc, a circle and an ellipse thus detected into the memory 53 as edge information.

[Edge Extraction Section]

From the edge information thus obtained, the controller 51 further extracts only an edge section positioned in close proximity to the specified point. When the user specifies one point of an observation image as a point by way of point indication section, the edge extraction section searches for and extracts an edge section on the periphery of the point. The point indication section for indicating a point may be a pointing device such as a mouse 55a. The point is indicated with a mouse cursor C on the display 52, as shown in FIGS. 3 through 5. For the timing of extraction of an edge section may be an arbitrary timing specified by the user with a click on the mouse. Alternatively, an edge section may be automatically extracted by the approach of the mouse cursor.

Extraction of an edge is made within a predetermined range using the point as a reference. For example, edge extraction is determined based on the shortest distance between the coordinates indicated by the mouse cursor C and the coordinates of a boundary in the edge section. The shortest distance is may be specified as a preset value or may be arbitrarily set by the user. Alternatively, it is determined whether an edge section is contained in a circle having a predetermined radius whose center is the point or a rectangle region having vertices as points. In case an edge section is contained, the edge section is selected and undergoes the highlight processing mentioned later. In case a plurality of edge sections are contained, they are judged in predetermined order. For example, only the edge section closest to the point is selected. In case an edge section is not contained in close proximity to the point, no edge sections are selected. For example, different screen messages may be displayed between a case where an edge section is selected and a case where one is not selected. A sound effect or voice guidance maybe used. Alternatively, an alarm message may be displayed on the screen or an alarm sound may be issued for guidance only in case an edge section is not selected.

Further, a selection approach called snap feature may be employed: the end or midpoint of an edge, center or center of gravity of a region enclosed by an edge are extracted as characteristic points for automatic selection. In this case, the mouse cursor C may move to trace the selected characteristic points, or only selection may be made without travel of the mouse cursor C. The characteristic points to be extracted may be geometric graphic information on the edge section or graduations of a ruler, grid line, or arbitrary guide line provided on the display 52. Which characteristic points are to be selected or selected on a preferential basis may be determined by the user. The snap range may be specified by the user.

[Highlight Section]

The edge section thus extracted and selected undergoes predetermined image processing by the controller 51 as highlight section and displayed over the observation image. The highlight processing is made on the geometric shapes such as a line segment or an arc extracted as and edge. To be more specific, the processing performs color conversion, or changes the color of the edge section or colors the edge, represents the edge in dotted lines or bold lines, and causes the edge to blink. Alternatively, image processing may be done to increase or decrease the brightness of the image data in the edge section. The edge section which has undergone highlight processing is displayed over the original observation image, so that the user can visually understand which edge has been selected.

[Arithmetic Operation Section]

The controller 51 also functions as arithmetic operation section for executing predetermined arithmetic operation based on the selected edge section. The predetermined arithmetic operation includes operation of the length or inclination of a line segment and the area of a region in the edge section. These undergo arithmetic operation based on the coordinate position of the selected edge section. In this embodiment, an edge section is uniquely selected by way of the aforementioned means, so that the arithmetic operation results obtained based on this selection is independent of operators and with high reproducibility. The arithmetic operation section may perform arithmetic operation based on a plurality of edge sections selected. For example, the shortest distance from an end of an edge, distance between center points, tangent, drawing of and the distance of a normal, measurement of inclination, and distance between the specified two points may be easily made by any user with the same results. Which arithmetic operation is to be performed may be individually determined by the user or arithmetic operation to be performed may be set in advance. The timing of arithmetic operation may be specified by the user on an arbitrary basis or automatically displayed in an information display region 52C when the edge section is selected. A single click of mouse may be used to select the edge section and a double click to perform arithmetic operation.

[Selection of Edge Section]

Figure 3A:
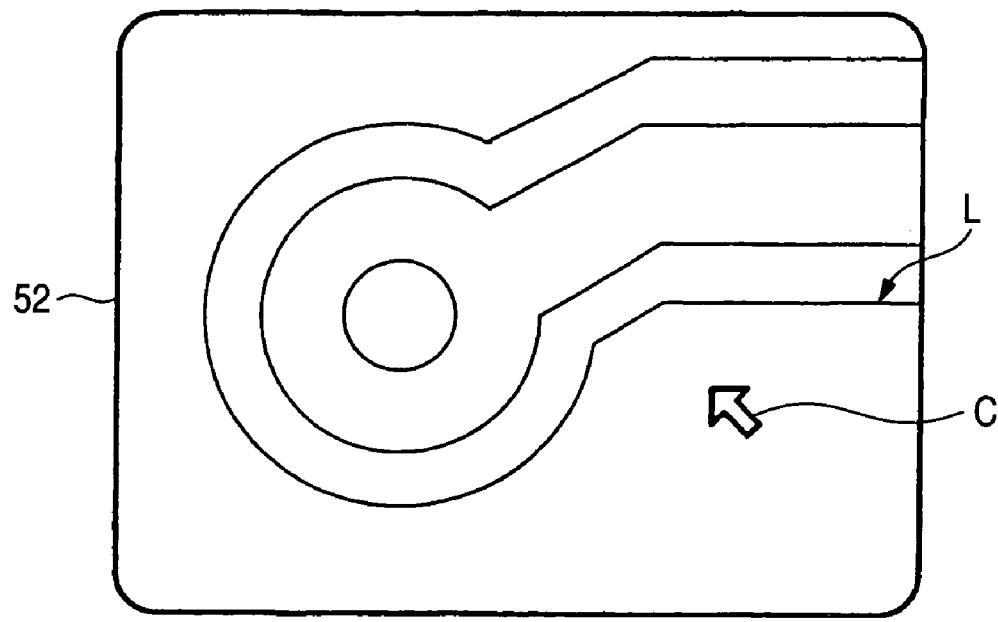
FIGS. 3A and 3B are image drawings showing a display example of an extracted edge section according to an embodiment of the invention.
Figure 3B:
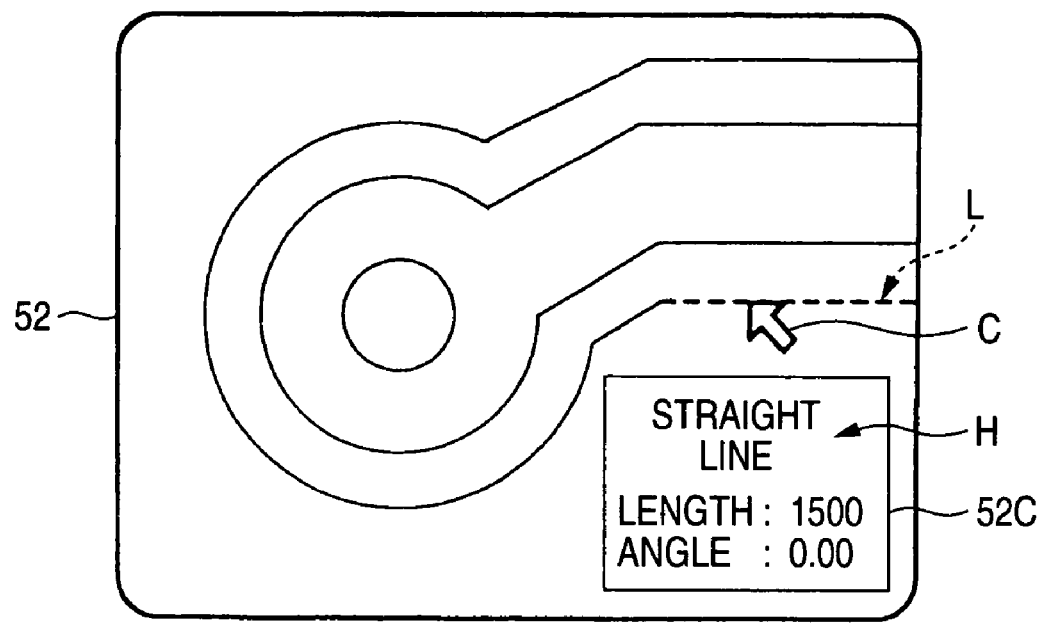

Next, the procedure to select an edge section contained in an observation image will be described referring to FIGS. 3A through 5. In these figures, the edge section of an image close to the point specified by a pointing device 55a is displayed while highlighted on the display 53. FIGS. 3A and 3B are general views showing edge extraction of a straight line L. FIG. 3A shows an original observation image. FIG. 3B shows the image over which is displayed the extracted edge of the straight line L being highlighted.

To obtain the observation image of FIG. 3A, the focus is adjusted and the height z of the stage is determined. Then a magnified image is read using the camera 10a. In FIG. 3A, the point (mouse cursor C) in the image indicated by the pointing device 55a indicates a position apart from the edge section in the image. The image stored into the memory 53 as an image data storage is displayed on the display 52 without the edge section being highlighted. Next, in FIG. 3B, the mouse cursor C indicates the periphery of the straight line L as an edge section of the image. The edge section detected by the controller 51 is highlighted and displayed on the display 52 for example as a straight line color-converted to red (straight line L in dotted lines in FIG. 3).

In this practice, the controller 51 performs arithmetic operation of the geometric information H on the straight line L, for example "straight line" as the type of geometric shape, "angle" with respect to a horizon on the screen on the display 52 and "length of line segment" on the screen as numerical values concerning geometric shape. Such information is displayed as edge information in the information display region 52C of the display 52.

Figure 4A:
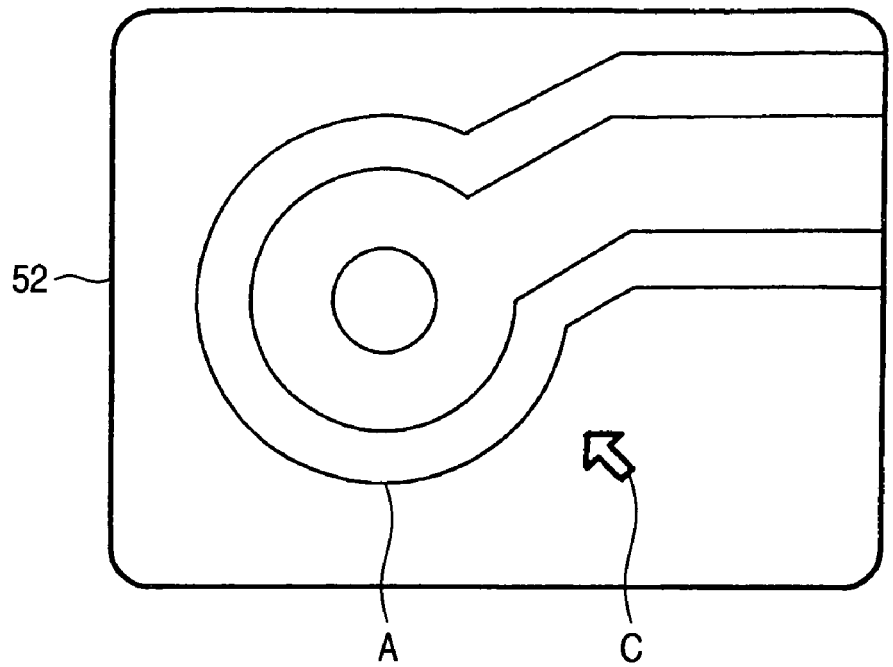
FIGS. 4A and 4B are image drawings showing another display example of an extracted edge section according to an embodiment of the invention.
Figure 4B:
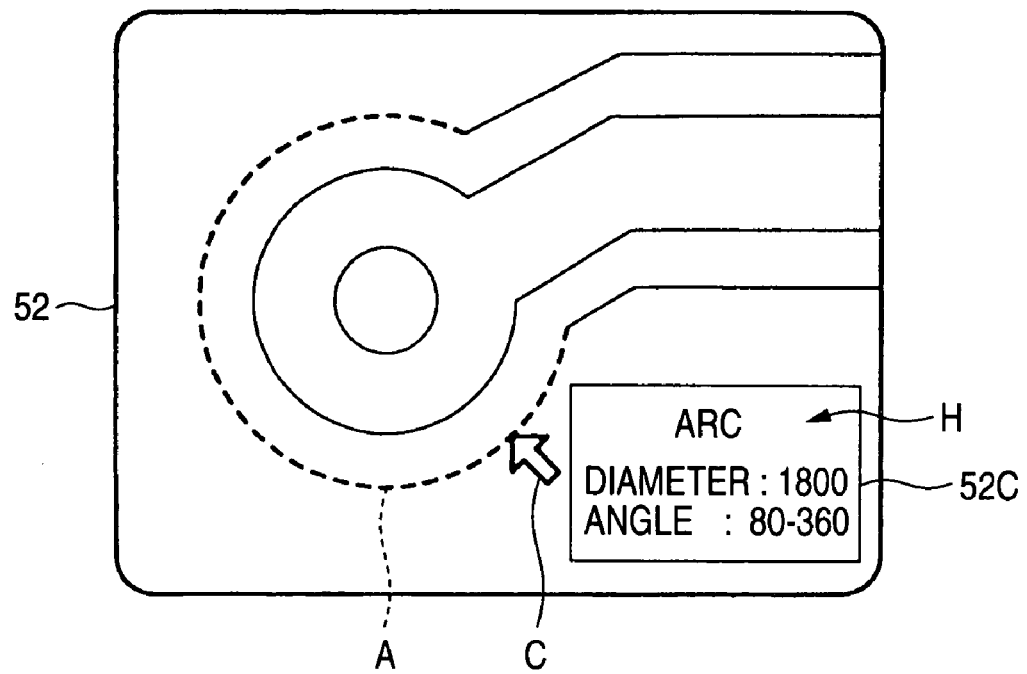
Figure 5:
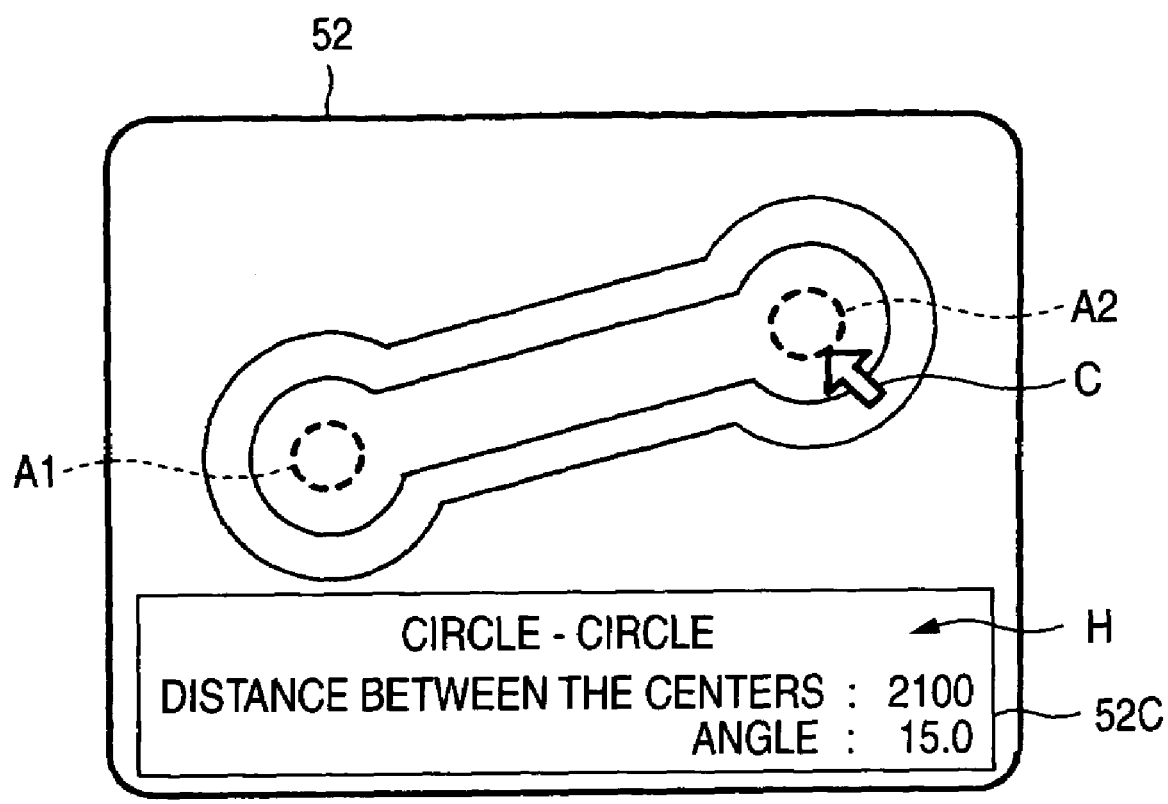
FIG. 5 is an image drawing showing a display example of extracted edge sections according to an embodiment of the invention.

Next, edge extraction of an arc A is described referring to FIGS. 4A and 4B. FIG. 4A is a general view of an original image containing the arc. FIG. 4B is a general view of a highlighted image of FIG. 4A. FIG. 4A shows an image read with the camera 10a when the focus is adjusted and the height z of the stage is determined. In FIG. 4A, the mouse cursor C indicates a position apart from the edge section in the image. The image stored into the memory 53 as an image data storage is displayed on the display 52 without the edge section being highlighted. Next, in FIG. 4B, the mouse cursor C indicates the periphery of the arc A as an edge section of the image. The edge section detected by the controller 51 is highlighted and displayed on the display 52 for example as an arc color-converted to red (arc A represented in dotted lines in FIG. 4B). In this practice, the geometric information H on arc A, for example arc as the type of geometric shape, starting point angle and endpoint angle with respect to a horizon on the screen on the display 52, and length of the arc and radius of the arc are displayed as numerical values concerning geometric shape.

FIG. 5 shows a case where a plurality of edge sections are selected and arithmetic operation is performed based on the selected sedge sections. In FIG. 5, edge extraction is selected on two circles A1, A2 on the display 52. The distance between the centers of these circles and the angle formed between the straight line connecting the centers and a horizontal plane are displayed in the information display region 52C. In FIG. 5, the circle A1 as an edge section detected with the indication of the mouse cursor C is highlighted. The geometric information on the circle A1 is displayed in the information display region 52C on the display by way of operation such as a double click. Meanwhile, the circle A2 as an edge section detected with the indication of the same mouse cursor C is highlighted. The geometric information on the circle A2 can be also displayed in the information display region 52C on the display by way of operation such as a double click.

In this way, on the magnifying observation apparatus according to an embodiment of the invention, the controller 51 can detect a plurality of edge sections and set the geometric information as a target to be displayed on the display. The edge sections whose geometric information are set as a target to be displayed on the display may undergo highlight processing different from that on the edge section detected with the indication of the mouse cursor C. For example, the edge sections extracted and selected undergo color conversion into red. The edge sections whose geometric information is set as a target to be displayed undergo color conversion into blue. The controller 51 performs arithmetic operation of geometric numerical values between the two circles A1, A2 and displays on the display 52 the values as the geometric information on the regions between edge sections subjected to arithmetic operation. The geometric numerical values between the two circles A1, A2 include the distance between the centers of circles and the angle of the straight line connecting the centers of the circles with respect to a horizon on the screen on the display 52. When the edge sections are a circle and a straight line, for example, a normal may be drawn from the center of the circle to the straight line or a tangent from the end of the line segment toward the circle, then the length and inclination of these lines may undergo arithmetic operation for later display.

While the geometric numerical values on the circles as two edge sections undergo arithmetic operation in this example, it is possible to extract more than two edge sections and perform arithmetic operation of the geometric numerical values between the edge sections, then display the results on the display 52. The geometric numerical values between the edge sections are not limited to the distance between the centers of the circles and the angle of the straight line connecting the centers. It can include a variety of geometric numerical values such as the shortest distance between the centers of the circle and the arc and the straight line, the shortest distance between the circumference of the circle and the arc and the straight line, and the angle formed between two straight lines.

[Edge Section Selection Procedure]

Figure 6:
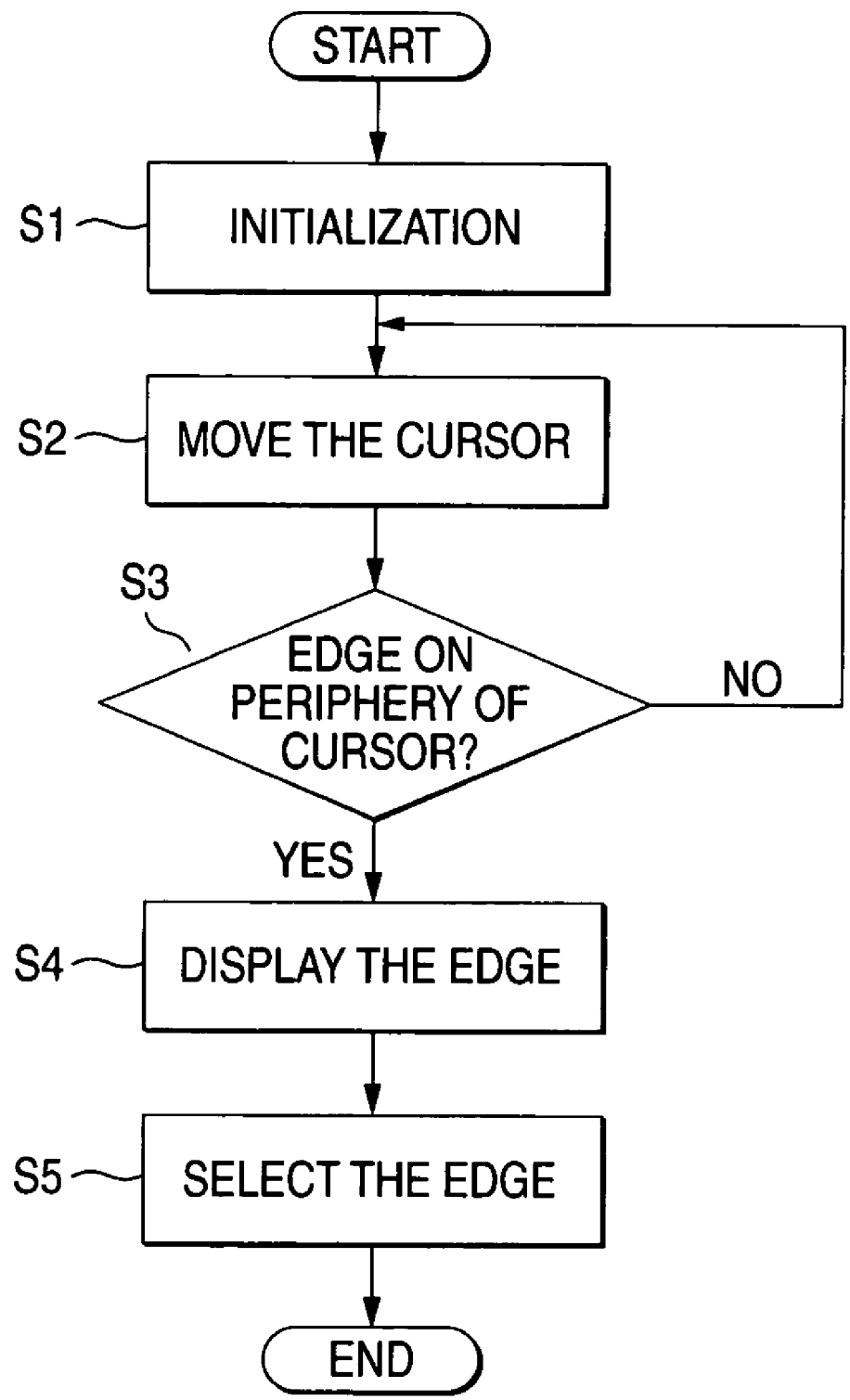
FIG. 6 is a flowchart showing the operation of the magnifying observation apparatus according to an embodiment of the invention.

Next, the operation of the magnifying observation apparatus according to an embodiment of the invention will be described. FIG. 6 is a flowchart showing the operation of the magnifying observation apparatus according to an embodiment of the invention. When the magnifying observation apparatus is activated, a camera 10*a*, a stage elevator 20 and an information processor 50 are initialized (step S1). Next, the point in the image displayed on a display 52 is indicated by a pointing device 55*a* (step S2).

Next, it is determined whether an edge section previously detected by the controller 51 is present on the periphery of a point indicated by the pointing device 55*a* (step S3). Determination on whether an edge section is present on the periphery of the indicated point is made by determining whether the shortest distance between the indicated point and the edge section is below a predetermined value.

When it is determined that an edge section is present on the periphery of a point indicated by the pointing device 55*a* in step S3, the edge section undergoes color conversion to red as highlight processing and displayed on the display 52 (step S4). When a plurality of edge sections are present on the periphery of the indicated point, the edge section whose shortest distance is the smallest undergoes highlight processing first and displayed on the display 52. In case it is determined that an edge section is absent on the periphery of the point indicated by the pointing device 55*a* in step S3, execution proceeds to step S2 and the same operation is repeated. In step S4, the edge section which has undergone highlight processing and is displayed is selected. Then the edge section is set as a target of arithmetic operation of geometric information on the edge section, and the corresponding geometric information is displayed (step S5).

The foregoing example shows a case where the edge section color-converted to red as highlight processing and displayed is selected, and is set as a target of arithmetic operation of the geometric information on the edge section. The edge section whose geometric information is to be displayed on the display may be set by way of setting operation such as a double click. With this configuration, in case the controller detects a plurality of edge sections, the operator can use setting operation such as a double click to select as required the edge section whose geometric information is to be displayed on the display. In this case, the edge section set as a target whose geometric information is to be displayed on the display preferably undergoes highlight processing different from that on the edge section detected with the indication of the mouse cursor C, for example color-converted to blue before it is displayed. With this configuration, the operator can discriminate between the previously set edge section (represented in blue) and the edge section to be set (represented in red).

While a case where a reflected light from the sample of an observation subject fixed to the observation subject fixing section is electrically read in the foregoing embodiment, a light may be irradiated from behind the sample and the transmitted light may be electrically read. While the sample is placed on the stage as an example of the observation subject fixing section, an arm may be attached instead of a stage and the sample may be fixed to the tip of the arm.

While an edge is extracted automatically and highlighted on the display when the mouse cursor C is brought closer, an edge may be extracted only in case some requesting operation is made, for example, a click of mouse.

The processing in the embodiment may be executed by way of program software executable on a computer or hardware such as a predetermined gate array (FPGA and ASIC). The processing may be executed by way of a combination of program software and partial hardware modules to implement part of components in FIGS. 1 and 2. In case hardware is included, the components need not be identical with the configuration shown in FIGS. 1 and 2, but the components whose features are substantially identical and the components equipped with the feature of a plurality of components shown in FIGS. 1 and 2 are included in the invention.

As mentioned earlier, according to a magnifying observation apparatus, a method for observing the magnified image, and a computer-readable medium storing instructions for operating the magnifying observation apparatus, according to the invention, it is possible to detect an edge section in an observation image photographed, perform image processing such as highlight processing on the image, and displays the resulting image. With this configuration, it is possible to easily detect an edge section such as a circle and a straight line and uniquely determine the edge section. This allows any operator to obtain the measurement results and arithmetic operation results with high reproducibility.

What is claimed is:

1. A magnifying observation apparatus comprising:
an imaging section for photographing an observation image;
a display section for displaying the observation image based on an image signal acquired with said imaging section;
an edge detection section for performing signal processing on the image signal acquired with said imaging section and detecting edge information on an edge contained in the observation image;
a point indication section for indicating an arbitrary point in the observation image displayed with said display section;
an edge extraction section for extracting an edge section on the periphery of the point indicated with said point indication section based on the edge information on the observation image; and
a highlight section for performing predetermined image processing on the edge section extracted with said edge extraction section and displaying the resulting edge section over the observation image.

2. A magnifying observation apparatus according to claim 1, wherein said edge detection section performs arithmetic operation of geometric information on the detected edge section, and displays the geometric information on said display section.

3. A magnifying observation apparatus according to claim 1, wherein said edge detection section detects only the section matching a predetermined pattern in the edge information contained in the observation image.

4. A magnifying observation apparatus according to claim 3, wherein said predetermined pattern is at least one of a straight line, a circle, and an arc.

5. A magnifying observation apparatus according to claim 1, further comprising:
an arithmetic operation section for executing predetermined arithmetic operation based on the extracted edge section.

6. A magnifying observation apparatus according to claim 5, wherein said point indication section indicates a plurality of points in a single observation image to select a plurality of edge sections and said edge extraction section extracts the respective edge sections corresponding to these points, and wherein said arithmetic operation section executes predetermined arithmetic operation based on the selected edge sections and display the result of arithmetic operation on said display section.

7. A method for observing a magnified image which uses a magnifying observation apparatus comprising an imaging section for photographing an observation image and a display section for displaying the observation image based on an image signal acquired with said imaging section, said method comprising:
performing signal processing the image signal acquired with said imaging section and detecting edge information on an edge contained in the observation image;
indicating an arbitrary point in the observation image displayed with said display section;
extracting an edge section on the periphery of the point indicated based on the edge information on the observation image; and
performing predetermined image processing on the edge section extracted and displaying the resulting edge section over the observation image.

8. A method for observing a magnified image according to claim 7, further comprising;
performing arithmetic operating of geometric information on the detected edge section and displaying the geometric information on the display section.

9. A method for observing a magnified image according to claim 7, wherein said edge detection step detects only the section matching a predetermined pattern in the edge information contained in the observation image.

10. A method for observing a magnified image according to claim 9, wherein said predetermined pattern is at least one of a straight line, a circle, and an arc.

11. A method for observing a magnified image according to claim 7, further comprising:
executing predetermined arithmetic operation based on the extracted edge section.

12. A method for observing a magnified image according to claim 11, wherein said indication step indicates a plurality of points in a single observation image to select a plurality of edge sections and said extraction step extracts the respective edge sections corresponding to these points, and wherein said arithmetic operation step executes the arithmetic operation based on the selected edge sections and displays the results of the arithmetic operation on said display section.

13. A computer-readable medium storing instructions for operating the magnifying observation apparatus an imaging section for photographing an observation image and a display section for displaying the observation image based on an image signal acquired with said imaging section, said instructions comprising;
performing signal processing the an image signal acquired with said imaging section and detecting edge information on an edge contained in the observation image;
indicating an arbitrary point in the observation image displayed with said display section;
extracting an edge section on the periphery of the point indicated based on the edge information on the observation image; and
performing predetermined image processing on the edge section extracted and displaying the resulting edge section over the observation image.

14. A computer-readable medium storing instructions for operating the magnifying observation apparatus according to claim 13, said instructions further comprising;
performing arithmetic operating of geometric information on the detected edge section and displaying the geometric information on the display section.

15. A computer-readable medium storing instructions for operating the magnifying observation apparatus according to claim 13, said instructions further comprising;
executing predetermined arithmetic operation based on the extracted edge section.

* * * * *